United States Patent [19]

Saverio

[11] 4,006,632
[45] Feb. 8, 1977

[54] AIRCRAFT TURN COORDINATOR

[75] Inventor: Del Bianco Saverio, Milan, Italy

[73] Assignee: Aeritalia S.p.A., Milan, Italy

[22] Filed: Nov. 4, 1975

[21] Appl. No.: 628,737

[52] U.S. Cl. .......................................... 73/178 R
[51] Int. Cl.² ..................................... G01C 21/00
[58] Field of Search ......... 73/178 R, 178 H, 178 T; 33/328, 329; 116/DIG. 43

[56] References Cited

UNITED STATES PATENTS

| | | | |
|---|---|---|---|
| 1,985,148 | 12/1934 | Chappell et al. | 73/178 R |
| 3,355,943 | 12/1967 | Mills et al. | 33/328 |

Primary Examiner—Donald O. Woodiel
Attorney, Agent, or Firm—John H. Widdowson; Edwin H. Crabtree

[57] ABSTRACT

An aircraft turn coordinator used in an aircraft to sense both yaw and roll rate along the longitudinal flight axis. The coordinator includes a gimbaled rate gyroscope which is connected to a turn indicator arm by a gear train. The rapid rotation or lashing of the gimbaled gyroscope due to air turbulence is reduced by dampening the movement of the gimbal.

6 Claims, 4 Drawing Figures

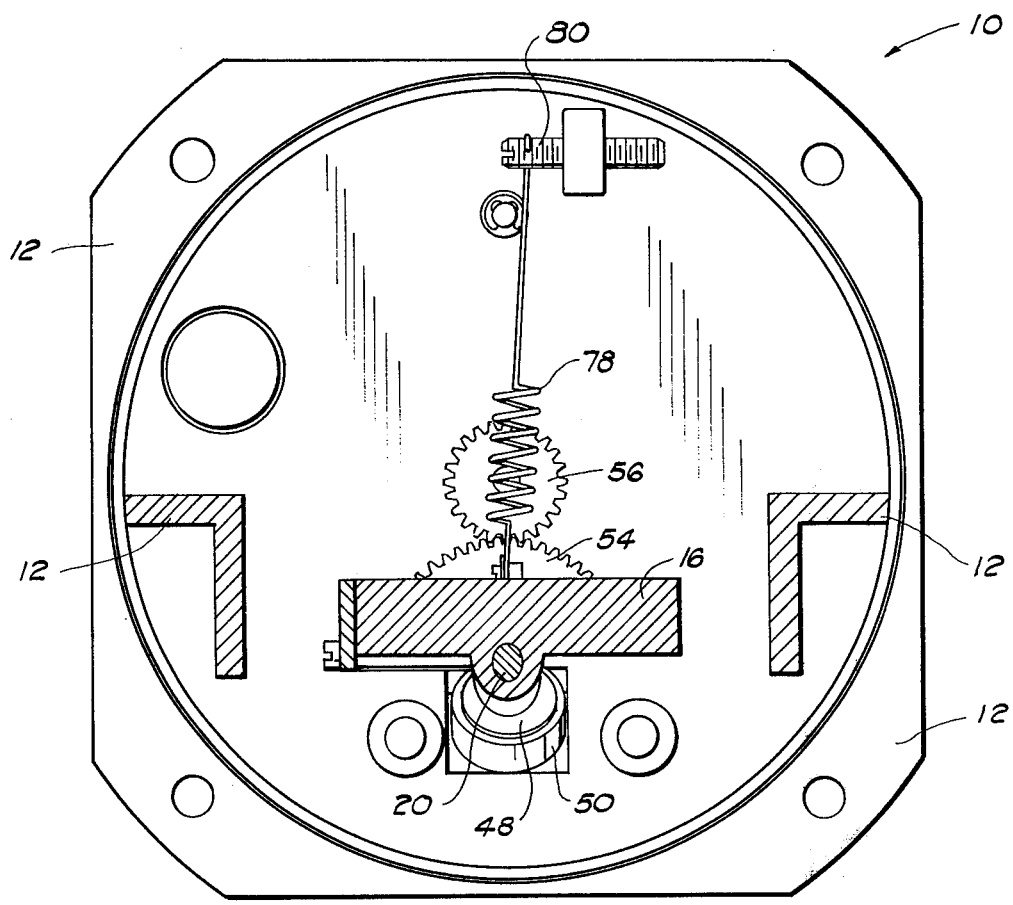
FIG. 2
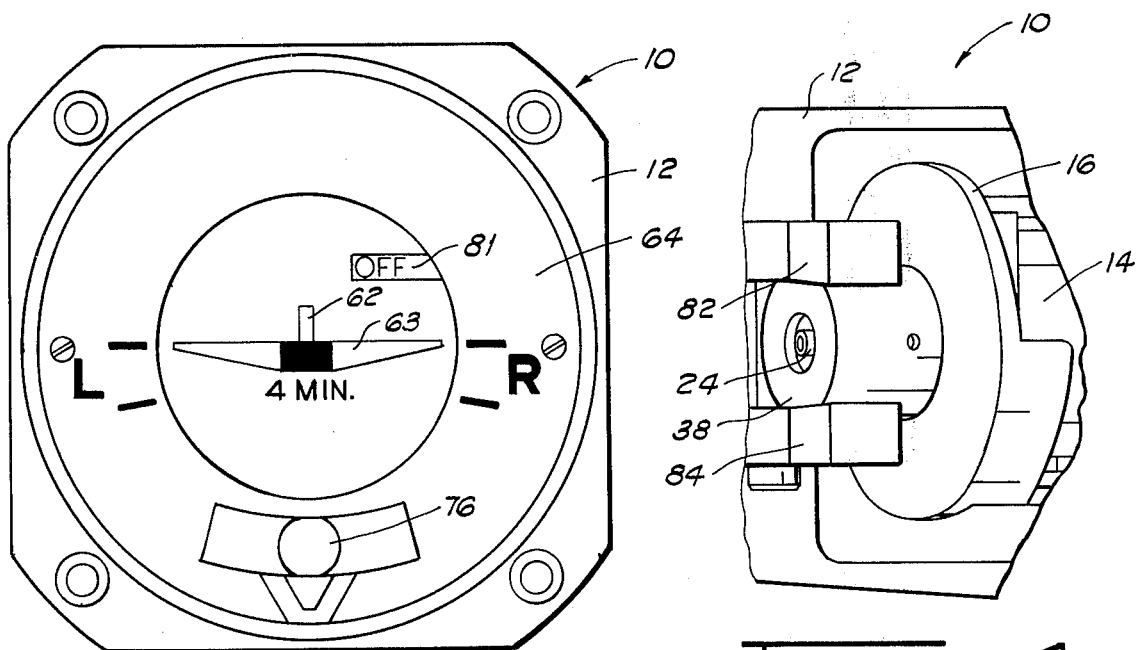
FIG. 3
FIG. 4

AIRCRAFT TURN COORDINATOR

BACKGROUND OF THE INVENTION

This invention relates generally to aircraft instruments and more particularly but not by way of limitation to an improved aircraft turn coordinator for determining the yaw and roll rate of the aircraft.

In the flying of an aircraft a turn coordinator aids the pilot in initiating a coordinated turn maneuver. During brief disturbances due to air turbulences the gimbaled rate gyroscope will experience rapid rotation or lashing do to the movement of the aircraft. This rotation or lashing of the gimbaled gyroscope causes the turn indicator arm to move back and forth on the indicator dial face. This movement of the turn coordinator can be disconcerting and often causes an inexperienced pilot to over control the maneuvering of the aircraft resulting in an inaccurate turn maneuver.

Prior art turn coordinators have dampened the indicator arm by coupling the arm to the gimbaled gyroscope with a spring. The movement of the spring is dampened by a fluid damper. This type of coordinator does not prevent the lashing of the gyroscope and gimbal.

SUMMARY OF THE INVENTION

The improved aircraft turn coordinator as disclosed herein eliminates the problem of the rapid rotation or lashing of the gimbaled rate gyroscope by dampening the gimbal. Also the subject invention by dampening the gimbal and gearing the gimbal to the indicator arm, the movement of the indicator arm is more gradual and uniform in response to the rapid movement of the aircraft during air turbulence. This uniform response of the indicator arm helps prevent the pilot from over controlling the aircraft.

Because of these improvements the improved turn coordinator is more reliable and safer to use. Also the improved instrument is not subject to excessive wear and eventual failure.

The advantages and objects of the invention will become evident from the following detailed description when read in conjunction with the accompanying drawings which illustrates the preferred embodiments of the invention.

BRIEF DESCRIPTION OF THE DRAWINGS

FIG. 2 is a sectional view of the turn coordinator taken along section lines 2—2.

FIG. 3 is a front view of the turn coordinator dial face.

FIG. 4 is a partial top view of the rear portion of the turn coordinator.

DETAILED DESCRIPTION OF THE DRAWINGS

Figure 1:
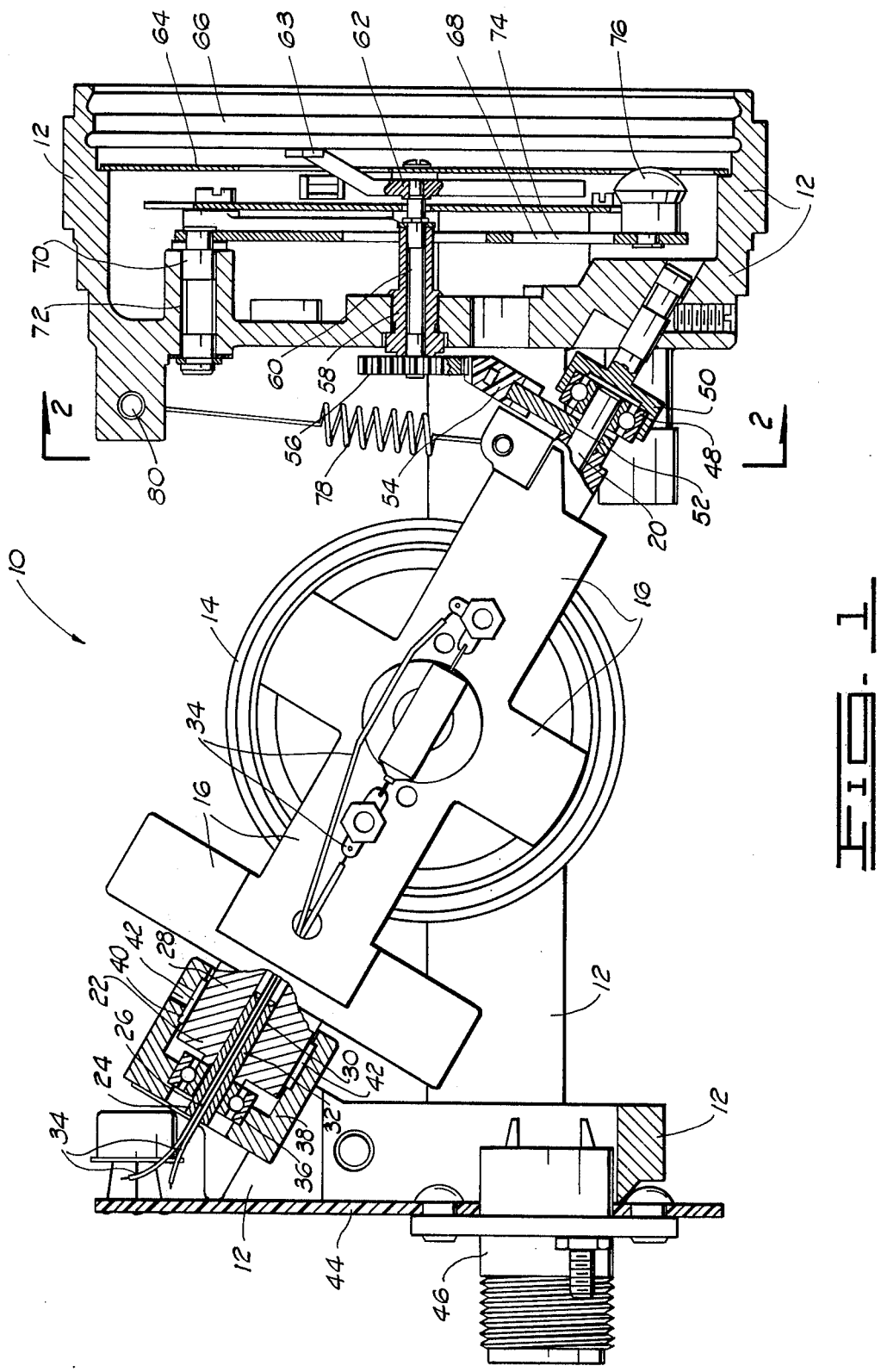
FIG. 1 is a sectional side view of the turn coordinator.

The improved turn coordinator is characterized by general reference number 10. The coordinator 10 includes an elongated coordinator housing 12. In the center portion of the housing 10 is a canted rate gyroscope 14 rotatably attached to a gimbal 16.

The gimbal 16 includes a front shaft 20 and a rear shaft 22. The rear shaft 22 includes a hollow first portion 24 having an aperture 26 therein, and a hollow second portion 28 with an aperture 30 therein. An end portion 32 of the first portion 24 of the rear shaft 22 is secured inside the aperture 30. Inserted through aperture 26 is electrical wiring 34 for providing electrical power to the rate gyroscope 14.

The first portion 24 of the rear shaft 22 is rotatably mounted to a rear ball bearing 36. Rear ball bearing 36 is secured to a rear bearing housing 38. The housing 38 is secured to the rear portion of the coordinator housing 12. The inner surface of the bearing housing 38 is annular and provides a bearing surface 40 wherein a dampening fluid 42 such as silicone or any other viscous type fluid having similar properties is contained therein between the bearing surface 40 and the second portion 28 of the rear shaft 22.

The rear portion of the coordinator housing 12 further includes a printed circuit board 44 and an electrical connector 46 for providing electrical power to the wiring 34.

The front shaft 20 is rotatably attached to a front ball bearing 48. The front ball bearing 48 is attached to a front bearing housing 50. The housing 50 is secured to the front portion of the indicator housing 12.

Attached to the front shaft 20 is a sectional gear arm 52. The arm 52 is connected to a sectional drive gear 54. Sectional drive gear 54 drives a pinion gear 56. The pinion gear 56 is attached to a pinion gear shaft 60. The shaft 60 is rotatably mounted on a plain bearing 58 secured in the coordinator housing 12. The pinion gear shaft 60 is attached to a turn indicator arm 62. Turn indicator arm 62 includes a small simulated aircraft 63 positioned alongside an indicator dial face 64. The face 64 and arm 62 are protected by a glass cover 66.

The front portion of the coordinator housing further includes a sideslip indicator 68 which is pendulously suspended from a roller 70 mounted on a plain bearing 72. The sideslip indicator 68 includes a sideslip indicator arm 74 and a weighted mass 76.

The gimbal 16 is biased toward its normal operating position by a coil spring 78. The spring 78 is attached to an arm 80 secured to the housing 12. The other end of the spring 78 is attached to the gimbal 16.

FIG. 2 is a rear view of the front portion of the coordinator housing 12 taken along section lines 2—2 shown in FIG. 1. In this view sectional gear 54 can be clearly seen meshing with the pinion gear 56. A section of the front of the gimbal 16 can be seen with front shaft 20 rotatably connected to the front ball bearing 48.

FIG. 3 is a front view of a standard dial face 64 for use in a turn coordinator. The electrical power to the coordinator 10 is indicated by an on and off switch shown as arm 81. Movement of the simulated aircraft 63 to either the left or right represented by L and R on the face 64 would indicate the amount of the yaw and roll rate along the longitudinal flight axis. The longitudinal flight axis in this disclosure would be represented by an imaginary line representing a horizontal axis drawn through the center of the elongated coordinator housing 12 and through the center of the dial face 64, along the axis of the pinion shaft 60 and from there through the center of the gyroscope 14. The gyroscope 14 is shown canted to this horizontal axis so that both the yaw and roll rate can be detected.

FIG. 4 shows a top partial view of the rear portion of the coordinator housing 12. In this view the housing 10 includes arms 82 and 84 for securing the rear bearing housing 38 in place. Extending out of the housing 38 can be seen the first portion 24 of the rear shaft 22.

In operation the rate gyroscope 14 suspended by the gimbal 16 is powered electrically. It is recognized that while the gyroscope 14 is powered electrically it could also be powered by compressed air or any other recognized means.

As the gyroscope 14 and gimbal 16 rotate about the gimbals front and rear shafts 20 and 22 rapid movement or lashing of the gimbal 16 and the gyroscope 14 is prevented by floating the bearing surface of the rear shaft 22 on a dampening fluid 42 contained between the bearing surface of the rear shaft 22 and the rear bearing housing surface 40.

As the gimbal shafts 20 and 22 rotate the attached sectional drive gear 54 meshes with the pinion gear 56. Pinion gear 56 turns the pinion gear shaft 60 thereby turning indicator arm 62. The turning of the arm 62 indicates the amount of the yaw and roll rate of the aircraft.

Changes may be made in the construction and arrangement of the parts or elements of the embodiments as disclosed herein without departing from the spirit or scope of the invention as defined in the following claims.

I claim:

1. An aircraft turn coordinator used in an aircraft to sense both yaw and roll rate along the longitudinal flight axis, the coordinator comprising:
    an elongated coordinator having a front, center, and rear portion;
    a gyroscope;
    a gimbal having a front, center, and rear portion, said gimbal suspending said gyroscope from the center portion thereof;
    a front gimbal shaft attached to the front portion of said gimbal and rotatably secured to a front bearing in a front bearing housing, said front bearing housing attached to the front portion of said coordinator housing;
    a rear gimbal shaft attached to the rear portion of gimbal, gimbal said rear shaft rotatably secured to a rear bearing in a rear bearing housing, said rear bearing housing attached to the rear portion of said coordinator housing, said rear gimbal shaft including a first portion and a second portion, said first portion having a smaller diameter than said second portion, said first portion rotatably secured to said rear bearing, said second portion rotatably supported by a fluid damper means, said damper means contained between an annular surface of said second portion and an inner annular surface of said rear bearing housing;
    a drive gear secured to said front gimbal shaft for driving a pinion gear, said pinion gear attached to a pinion gear shaft; and
    a rotatable turn indicator arm attached to said pinion gear shaft and mounted alongside an indicator dial face and the front portion of said indicator housing, said gimbal, said drive gear, and said pinion gear co-acting together with said indicator arm to indicate the amount of yaw and roll rate of the aircraft on said indicator dial face.

2. The coordinator as described in claim 1 wherein said first and second portion of said rear shaft are hollow, part of said first portion of said rear shaft secured inside the hollow second portion of said rear shaft.

3. The coordinator as described in claim 1 further including:
    a biasing means attached to the front portion of said gimbal and the front portion of said indicator housing for centering said gimbal in its normal operating position.

4. The coordinator as described in claim 3 wherein said biasing means is a coil spring.

5. The coordinator as described in claim 1 wherein said gyroscope is a rate gyroscope canted along the horizontal axis of the elongated coordinator housing.

6. The coordinator as described in claim 1 wherein said drive gear is a sectional gear having a sectional gear arm attached to said gimbal shaft.

* * * * *

UNITED STATES PATENT OFFICE
CERTIFICATE OF CORRECTION

Patent No. 4,006,632     Dated February 8, 1977

Inventor(s) Del Bianco Saverio

It is certified that error appears in the above-identified patent and that said Letters Patent are hereby corrected as shown below:

Claim 1, Column 3, line 38, delete "gimbal,gimbal" and insert therefore -- said gimbal, --.

Signed and Sealed this twelfth Day of July 1977

[SEAL]

Attest:

RUTH C. MASON
*Attesting Officer*

C. MARSHALL DANN
*Commissioner of Patents and Trademarks*